Figure 1:
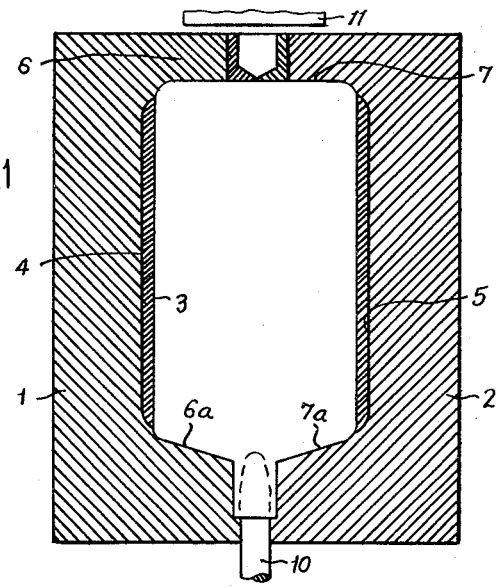

June 27, 1961  B. STRONG  2,989,776
METHOD OF AND APPARATUS FOR THE MANUFACTURE
OF BOTTLES AND OTHER HOLLOW ARTICLES FROM
ORGANIC PLASTIC MATERIALS
Filed April 29, 1959  2 Sheets-Sheet 1

Inventor
Bernard Strong
By
Attorneys

June 27, 1961

B. STRONG 2,989,776

METHOD OF AND APPARATUS FOR THE MANUFACTURE
OF BOTTLES AND OTHER HOLLOW ARTICLES FROM
ORGANIC PLASTIC MATERIALS

Filed April 29, 1959

2 Sheets-Sheet 2

Inventor
*Bernard Strong*
By
*Attorneys*

United States Patent Office 2,989,776
Patented June 27, 1961

2,989,776
METHOD OF AND APPARATUS FOR THE MANUFACTURE OF BOTTLES AND OTHER HOLLOW ARTICLES FROM ORGANIC PLASTIC MATERIALS
Bernard Strong, Northwood Hills, England, assignor to E. Shipton & Company Limited, Northwood Hills, England, a British company
Filed Apr. 29, 1959, Ser. No. 809,792
Claims priority, application Great Britain May 1, 1958
13 Claims. (Cl. 18—5)

The present invention relates to a method of and apparatus for manufacturing bottles and other hollow articles from organic plastic materials, commonly known as "plastics," in which the material in plastic form is extruded through an annular extrusion nozzle to form a tube of the plastic material which is enclosed in a mould cavity, the extruded tube then being blown up to conform with the contour of the surrounding mould cavity to form the hollow article.

In processes at present practiced for the manufacture of such hollow articles, the extruded tube is blown in a split mould, generally a two-part mould, the parts of which are moved together around the extruded plastic tube to enclose same within the mould cavity. With such processes slight ridges or seams are produced longitudinally of the hollow article by the parting lines between the mould parts when they are closed together. Although these ridges or seams are very slight and in many cases unobjectionable, they produce difficulties if the exterior surface of the article is to be printed since care has to be taken that the printing does not extend over the ridges or seams, otherwise irregularities in the printing are produced.

The present invention has for its object to provide an improvement in the process and apparatus for manufacturing bottles and other hollow articles as above described, in which the longitudinal ridges or seams are eliminated over at least that part of the article where printing is required to be applied.

To this end, according to one aspect, the invention consists in the process of manufacturing blown hollow articles which consists in surrounding an extruded plastic tube by a tubular mould part having a smooth bore which forms part of the wall of the mould cavity, closing split mould parts around the portions of the extruded plastic tube at opposite ends of the tubular mould part to complete the mould cavity, expanding the extruded plastic tube into conformity with the shape of the mould cavity, opening said split mould parts, and removing the formed hollow article from the tubular mould part.

The tubular mould part comprises a tube or tubular member, made of metal or other material in which the plastic can be moulded, of which the internal surface or bore is smooth and free from any longitudinal seams, grooves or corners, at least over a substantial part of the length of the bore, which can cause a longitudinal ridge or seam on the blown article. The tube itself may be made with a seam, for example it may be seam-welded, provided that its interior surface is smooth and does not produce a longitudinal ridge or seam on the blown article.

With the method described, the main body portion of the hollow article, for example the cylindrical body portion of a bottle, is formed by the bore of the tubular mould part, and since this is smooth and "seamless" the surface of the corresponding portion of the hollow article will be free from ridges or seams extending longitudinally thereof.

From another aspect, the invention consists in an apparatus for manufacturing bottles and other hollow articles from organic plastic material comprising an annular extrusion nozzle through which the plastic material is extruded in the form of a tube, and a mould comprising a tubular mould part having a smooth bore arranged to receive the extruded plastic tube and split mould parts adapted to be closed around the extruded tube at opposite ends of the tubular mould part.

The invention also consists in a mould for use in the manufacture of "seamless" blown hollow articles of plastic material as herein described. In one embodiment the mould comprising two separable parts having a cavity therebetween, and a length of tube adapted to fit within the cavity and to form, when the mould parts are closed therearound, a part of the wall of the mould cavity, the remaining parts of the wall of the cavity being formed by the two separable mould parts. One end of the separable mould parts may be shaped so as to pinch and close the extruded plastic tube, and the opposite end of the mould parts may be shaped to form the neck of the article around a blowing nozzle through which blowing fluid may be admitted to expand the plastic tube.

The invention further consists in a blown plastic bottle or hollow article made by the process herein described and having the exterior surface of its body portion free from longitudinal ridges or seams, at least for a substantial part of its length.

The method and apparatus according to this invention may be used whether the blowing air is admitted through the central core of the extrusion nozzle, whether the blowing nozzle is inserted into the lower end of the extruded tube, or whether the air is admitted in any other manner, for example by a needle which is inserted into the length of tube enclosed by the mould after both ends of the enclosed length have been pinched or closed.

Figure 2:
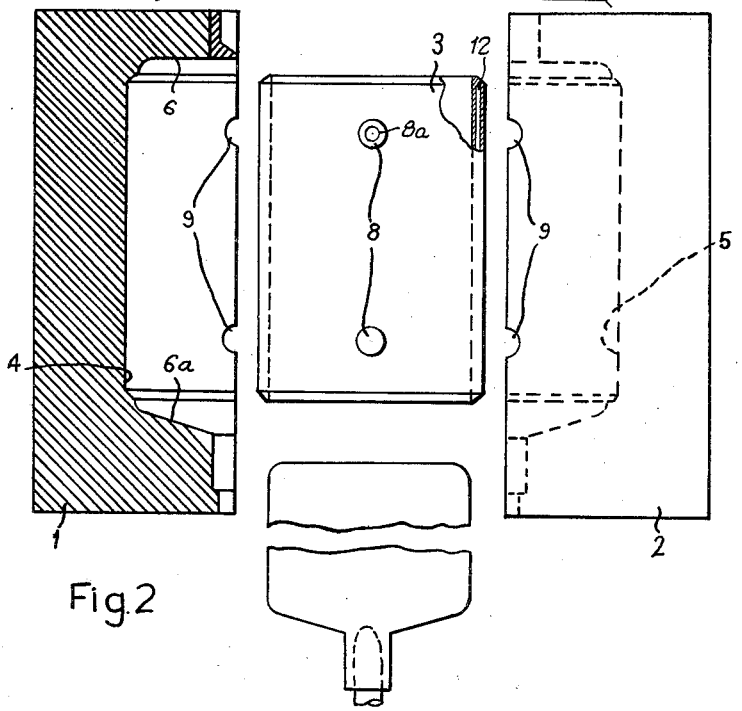
Figure 3:
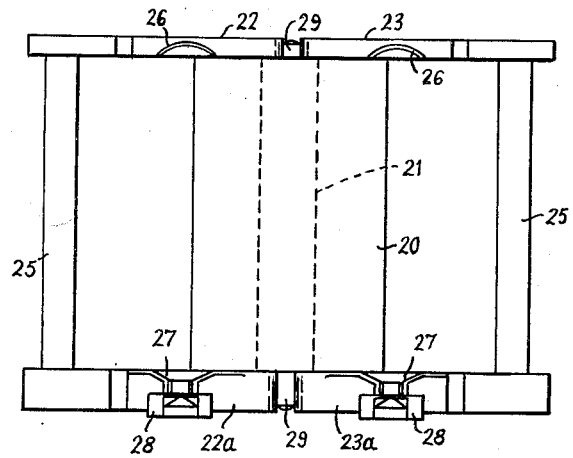
Figure 4:
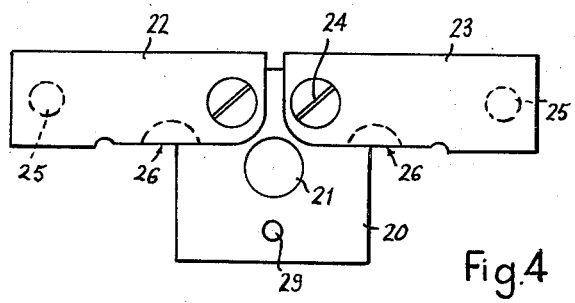
Figure 5:
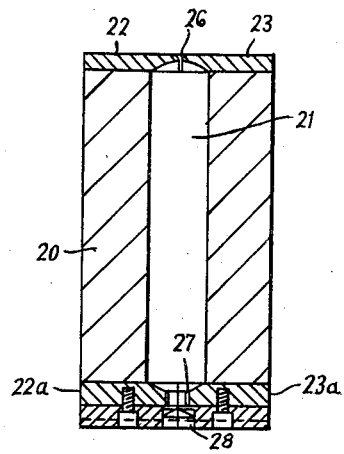

In order that the invention may be more clearly understood, reference will now be made to the accompanying drawing, in which:

FIGURE 1 is a section through one embodiment of a mould according to the invention, with the mould parts closed, FIGURE 2 is a side view, partly in section, with the mould parts open, FIGURE 3 is a side view of an alternative mould construction with the movable mould parts in the open position, FIGURE 4 is a plan view of FIGURE 3, FIGURE 5 is a section taken along the line A—A in FIGURE 4 but with the movable mould parts in the closed position.

The mould illustrated in FIGURES 1 and 2 is intended for upside down blowing. It comprises two separable mould parts 1 and 2 which, when closed, interfit with a "seamless" metal tube 3 which forms part of the wall of the mould cavity. The ends of the tube 3 may be chamfered and be adapted to locate in the correspondingly chamfered ends of the semi-cylindrical recesses 4, 5 formed in the two mould parts 1 and 2 so that the end portions 6, 6a, 7, 7a of the cavities in the separable mould parts will form continuations of the internal surface of the tube 3 when the mould parts are closed therearound. The tube 3 may be provided with one or more pins 8 extending outwardly therefrom and transversely to the direction of opening and closing movement of the mould parts 1 and 2. These pins 8 are adapted to locate in recesses 9 in the mould parts when they are closed around the tube. The pins 8 may also serve as the means for supporting the tube 3 when the mould parts 1 and 2 are in the open position.

In use the mould is positioned with the tube 3 directly below an annular extrusion nozzle 11 of the plastic extrusion machine. With the mould parts 1 and 2 open, a plastic tube is extruded downwardly through the tube 3. The blowing nozzle 10 is inserted into the lower end of the plastic tube and the mould parts 1 and 2 closed around the extruded tube. The mould parts may be moved by an air cylinder or in any other convenient way. Blowing air is admitted through the nozzle 10 to expand the plastic tube to form the hollow article, and after the article has rigidified the mould parts 1 and 2 are opened and the blown article is extracted by withdrawing it downwardly through the bottom of the tube 3 by lowering the blowing nozzle 10. To facilitate withdrawal the tube 3 may have its internal surface slightly tapered to a larger diameter at its lower end.

Conical bottles can be made by making the tube 3 of conical form with its larger diameter preferably at its lower end.

The process and apparatus according to this invention may also be used in the manufacture of so-called "collapsible tubes." The tube may be blown with a neck portion, a thin cylindrical side wall, and a bottom, whereafter the bottom is cut away to leave the tube with an open end for filling. Such collapsible tubes are generally printed on a mandrel, and the fact that the external surface of the tube is seamless is of considerable importance in carrying out the printing.

FIGURES 3 to 5 show the construction of a mould which is designed for making such collapsible tubes. In this embodiment the tubular mould part comprises a metal block 20 having a smooth bore 21 extending therethrough. To opposite ends of the block are attached pairs of movable mould parts 22, 23, 22a, 23a which are mounted for swinging movement about the pivots 24, the corresponding upper and lower parts of each pair being connected together by tie bars 25. The upper mould parts are formed with recesses 26 which, when they are closed, serve to pinch the plastic tube and also form the bottom of the container. The lower mould parts are formed with recesses 27 so as to form, when closed, the neck cavities which shape the neck of the container and form the screw thread thereon, the internal bore of the neck portion being sized by the blowing nozzle which projects into the lower end of the extruded plastic tube. The lower mould parts also carry cutters 28 for cutting the plastic against the blowing nozzle. Stop pins 29 are provided to locate the mould parts with their cavities in alignment with the bore 21.

After the container has been blown it is withdrawn through the bottom of the bore and the closed end of the container is cut off to form the collapsible tube.

Whilst particular embodiments have been described, it will be understood that various modifications may be made without departing from the scope of the invention. For example, the tube 3 may be formed as a hollow shell through which cooling water may be fed. The hollow passage for water is shown at 12 in FIGURE 2. The cooling water may be fed to the passage 12 in the shell through one of the pins 8 which may be made tubular as shown at 8a for this purpose, the cooling water being discharged through another hollow pin, preferably on the opposite side of the tube 3. In this way very intimate cooling of the hollow article is achieved which reduces the cooling time and thus accelerates the rate of production. This is of advantage even if the bottle is not intended to be finally printed.

In another modification the pins 8, which may again be in the form of tubes for supplying cooling water, may extend in the direction of opening and closing movement of the separable mould parts. The pins may then extend through apertures in the mould parts 1 and 2 and thus also serve as guides for locating the tube 3 relative to the movable mould parts.

I claim:

1. Process of manufacturing blown hollow articles from organic plastic materials which consists in surrounding an extruded tube of the plastic material by a tubular mould part which is open at both ends and has a smooth bore which forms part of the wall of a mould cavity, with the extruded tube projecting beyond both ends of the tubular mould part, closing split mould parts around the portions of the extruded plastic tube projecting at opposite ends respectively of the tubular mould part to close against said projecting portions and complete the mould cavity, expanding the extruded plastic tube into conformity with the shape of the mould cavity, opening said split mould parts, and removing the formed hollow article from the tubular mould part.

2. Apparatus for manufacturing bottles and other hollow articles from organic plastic materials, comprising an annular extrusion nozzle through which the plastic material is extruded downwardly in the form of a tube, and a mould comprising a tubular mould part having a smooth bore being open at both its top and bottom ends and being arranged directly below, but spaced from said nozzle so that the plastic tube will be extruded downwardly therethrough and split mould parts disposed at the top and bottom ends of the tubular mould part to complete the mould cavity, said split mould parts being movable to an open position in which they lie outside the vertical zone defined by the smooth bore of the tubular mould part.

3. Apparatus as claimed in claim 2, wherein the mould comprises two separable parts having a cavity therebetween, and a length of tube having a smooth bore adapted to fit within the cavity and to form, when the separable mould parts are closed therearound, a part of the wall of the mould cavity, the remaining parts of the wall of the cavity being formed by the two separable mould parts.

4. Apparatus as claimed in claim 3, wherein the tube is provided with projecting pins which locate in recesses in the separable mould parts.

5. Apparatus as claimed in claim 3, wherein the tube is formed with a cooling water passage therein.

6. Apparatus as claimed in claim 2, wherein the tubular mould part comprises a metal block having a bore therethrough, and wherein split mould parts are movably mounted at opposite ends of the block, said split mould parts being movable from a closed position where they form the end zones of the mould cavity to an open position in which both ends of the bore are fully exposed.

7. Process of manufacturing blown hollow articles from organic plastic materials which consists in downwardly extruding a tube of the plastic material through a tubular mould part which is open at its top and bottom ends, stopping extrusion when the tube extends completely through said tubular mould part with portions of said tube projecting beyond said top and bottom ends thereof, closing split mould parts around the portions of the extruded plastic tube projecting beyond said top and bottom ends respectively to complete the mould cavity, expanding the extruded plastic tube into conformity with the shape of the mould cavity, opening said split mould parts, and removing the formed hollow article from the tubular mould part.

8. Process of manufacturing blown hollow articles from organic plastic materials which consists in downwardly extruding a tube of the plastic material through a tubular mould part which is open at its top and bottom ends, stopping extrusion when the tube extends completely through said tubular mould part with portions of said tube projecting beyond said top and bottom ends thereof, closing split mould parts around the portions of the extruded plastic tube projecting beyond said top and bottom ends respectively to complete the mould cavity, said split mould parts at one end pinching the plastic tube to close it and at the oher end compressing the tube around a blowing nozzle, applying fluid pressure through said blowing nozzle into the length of plastic tube enclosed within the mould cavity whereby to expand said length of plastic tube into a hollow article conforming with the shape of the mould cavity, and, after the hollow article has rigidified, opening the split mould parts and withdrawing the formed hollow article through the open bottom end of the tubular mould part.

9. A method of manufacturing a collapsible tube of organic plastic material, comprising the steps of downwardly extruding a tube of organic plastic material, surrounding said extruded tube with a tubular mould part which is open at both ends so that said extruded tube projects beyond both ends of said mould part, inserting a blowing nozzle into one end of said extruded tube, closing upper and lower pairs of separable mould parts over each end of the tubular mould part to define a mould cavity, one of said pairs of separable mould parts pinching and closing the projecting portion of said extruded tube at one end and the other said pair compressing the other projecting portion of said extruded tube around said blowing nozzle to compression mould the neck of the collapsible tube, blowing the extruded tube to conform to the shape of the mould cavity, opening said pairs of separable mould parts, withdrawing the blown plastic tube, and cutting off the closed end thereof.

10. A mould comprising two separable parts each having a cavity therein adapted to co-operate with the cavity in the other part, shoulder means extending around the walls of the cavities adjacent opposite ends of said cavities to define therebetween a recess, and a length of tube open at both ends and adapted to seat in said recess with the internal surface of said tube substantially flush with the tops of said shoulder means, whereby to form, when the mould parts are enclosed therearound, a part of the wall of the mould cavity, the remaining parts of the wall of said cavity being formed by the two separable mould parts, said separable parts being shaped at one end to form a pinch and at the other end to form the external surface of the neck of a hollow article.

11. A mould as claimed in claim 10, wherein said tube length comprises two coaxial thin-walled tube parts of different diameter arranged one within the other, means closing the ends of said tube parts together to define an annular chamber for cooling fluid, and inlet and outlet means for said cooling fluid connected to said chamber.

12. A mould as claimed in claim 10, comprising means on said tube length co-operating with said separable parts to locate said tube length in correct relation with the cavity defined by the separable parts, and means for supporting said tube length when the separable parts are in the open position.

13. A mould comprising a tubular mould part, two pairs of separable mould parts, one pair being located at each end of said tubular part and being adapted to close together thereover to define a mould cavity, and tie-rod means connecting a separable mould part at one end of said tubular mould part with a separable mould part at the other end, the pair of mould parts at one end being shaped to form a pinch and the pair of mould parts at the other end being shaped to form the external surface of the neck of a hollow article.

References Cited in the file of this patent

UNITED STATES PATENTS

| | | |
|---|---|---|
| 2,128,239 | Ferngren | Aug. 30, 1938 |
| 2,706,308 | Lorenz | Apr. 19, 1955 |